(12) United States Patent
Xie et al.

(10) Patent No.: US 12,528,963 B2
(45) Date of Patent: Jan. 20, 2026

(54) AQUEOUS POLYMER DISPERSION AND USE THEREOF

(71) Applicant: Henkel AG & Co., KGaA, Dusseldorf (DE)

(72) Inventors: Xuan Xie, Shanghai (CN); JunJun Wu, Shanghai (CN)

(73) Assignee: HENKEL AG & CO. KGaA, Duesseldorf (DE)

( * ) Notice: Subject to any disclaimer, the term of this patent is extended or adjusted under 35 U.S.C. 154(b) by 403 days.

(21) Appl. No.: 17/807,013

(22) Filed: Jun. 15, 2022

(65) Prior Publication Data

US 2022/0403205 A1 Dec. 22, 2022

Related U.S. Application Data

(63) Continuation of application No. PCT/CN2019/125906, filed on Dec. 17, 2019.

(51) Int. Cl.
*C09D 133/08* (2006.01)
*B22F 3/26* (2006.01)
*C09D 129/10* (2006.01)

(52) U.S. Cl.
CPC ......... *C09D 133/08* (2013.01); *C09D 129/10* (2013.01); *B22F 3/26* (2013.01)

(58) Field of Classification Search
None
See application file for complete search history.

(56) References Cited

U.S. PATENT DOCUMENTS

| | | | |
|---|---|---|---|
| 3,672,942 A | 6/1972 | Neumann et al. | |
| 3,969,552 A | 7/1976 | Malofsky et al. | |
| RE32,240 E | 9/1986 | DeMarco | |
| 4,616,058 A * | 10/1986 | Yabuta | C08F 2/08 524/461 |
| 4,632,945 A | 12/1986 | Garcia et al. | |
| 5,120,785 A * | 6/1992 | Walker | C04B 26/04 524/451 |
| 5,208,282 A | 5/1993 | Rehmer et al. | |
| 5,656,710 A | 8/1997 | Newberth, III et al. | |
| 5,753,742 A * | 5/1998 | Bumanlag | C08K 5/0016 524/556 |
| 5,798,406 A * | 8/1998 | Feret | D06M 15/277 524/460 |
| 2002/0160182 A1 * | 10/2002 | Lorah | C08F 4/34 524/460 |
| 2003/0114616 A1 * | 6/2003 | Ishida | C08F 259/08 526/329 |
| 2004/0220329 A1 * | 11/2004 | Solomon | C08F 290/046 524/804 |
| 2005/0070653 A1 * | 3/2005 | Apitz | C09J 11/04 524/556 |
| 2014/0323608 A1 * | 10/2014 | Deller | C08F 2/22 523/122 |
| 2015/0307716 A1 * | 10/2015 | Jahns | C08F 220/14 106/285 |
| 2016/0268599 A1 | 9/2016 | Damen et al. | |
| 2016/0319501 A1 * | 11/2016 | Chailloux | C09D 175/04 |
| 2018/0179108 A1 * | 6/2018 | Yu | C08F 220/20 |
| 2019/0315995 A1 * | 10/2019 | Hibben | C08L 23/16 |

FOREIGN PATENT DOCUMENTS

| | | | | |
|---|---|---|---|---|
| CN | 1356365 A | 7/2002 | | |
| CN | 104357010 A | 2/2015 | | |
| CN | 105723547 A | 6/2016 | | |
| CN | 107474187 A | * 12/2017 | ................ | C08F 2/24 |
| JP | S6051772 A | 3/1985 | | |
| JP | H02187487 A | 7/1990 | | |
| JP | H04227947 A | 8/1992 | | |
| JP | 2003096148 A | * 4/2003 | ............ | C08F 291/06 |
| JP | 2011046546 A | * 3/2011 | ............ | C04B 24/24 |
| TW | 200512267 A | 4/2005 | | |
| WO | WO-2013117428 A1 | * 8/2013 | ............ | C09J 133/08 |
| WO | 2016001256 A1 | 1/2016 | | |

OTHER PUBLICATIONS

Plueddemann—Silane adhesion promoters in coatings—Prog.Org. Coatings—1983 (Year: 1983).*
Asano—JP 2011-046546 A—MT—Jap D4—acrylic dispersion—2011 (Year: 2011).*
Gerst—WO 2013-117428 A1—MT—polymer dispersion—2013 (Year: 2013).*
Zhang—CN 107474187 A—PCT D3+Jap D3—MT—carboxylic acrylonitrile butadiene latex—2017 (Year: 2017).*
Shiraga—JP 2003-096148 A—MT—polymer dispersion—2003 (Year: 2003).*

* cited by examiner

*Primary Examiner* — John Vincent Lawler
(74) *Attorney, Agent, or Firm* — Sun Hee Thomas

(57) ABSTRACT

The present invention provides an aqueous polymer dispersion comprising at least one polymer having a carboxyl group and optionally an additional functional group selected from hydroxy, isocyanate, fluoro, phosphate, hydrazide, acetoacetate group and combination thereof, in which the polymer has a glass transition temperature of larger than −40° C. and less than 35° C., and the aqueous polymer dispersion has a solid content of larger than 50% by weight.

11 Claims, No Drawings

AQUEOUS POLYMER DISPERSION AND USE THEREOF

TECHNICAL FIELD

The present invention relates to an aqueous polymer dispersion, and particularly relates to aqueous polymer dispersion used as impregnating composition for vacuum impregnation and use thereof.

BACKGROUND OF THE INVENTION

In metal castings such as casting aluminium and casting iron, and in electronic parts co-moulded by metal and plastic, there are usually many fine pores. These fine pores may cause leakage problem, which presents a significant obstacle to commercial utility, particularly when such porous parts are employed in fluid power systems and other liquid handling applications.

One method to solve this problem is to disperse sealants on the pores of the part by a dispersing machine. This fixed-point dispersing way has a lot of disadvantages, it may change the dimension of the part, affect the appearance of the part, and the formed sealants are on the outside surface of the part, which may easy to fail due to an impact. After failure, the sealant needs to be re-dispersed, which is costly and time-consuming.

Vacuum impregnation (VI) technology is an effective measure to seals porous parts without changing dimensional or functional characteristics. The vacuum impregnation technology is to infiltrate the impregnating agent into the fine pores of the metal part or component co-moulded by metal and plastic by vacuum-pressure process. When process of the vacuum impregnation is finished, the part is transferred to next processes i.e. cleaning process, the drying process or solidifying process where the impregnating agent forms sealant to fill the pores, to achieve the purposes of sealing and preventing leakage, and withstanding high pressure, thereby solves the leakage problem of the parts.

There are mainly three categories of impregnating composition used as vacuum impregnation sealants in the art, i.e. inorganic sodium silicate sealant, unsaturated polyester and functional polyacrylate resin. The sodium silicate sealant was the earliest category used in the industry, but it has a high viscosity, poor wettability, resulting in an unsatisfied porosity performance, which had gone out of use so far. Due to the high viscosity of the unsaturated polyester, to be used as the impregnating composition, the unsaturated polyester usually must be used together with a diluent. However, most diluent shows toxicity and a high volatile-organic-compound (VOC) release. Therefore, for environmental protection reason, the unsaturated polyester has been gradually replaced by functional polyacrylate resin in using as impregnating composition. Polyacrylate resin mainly comprises functional acrylate monomers. The emulsifier, chelating agents, additives such as a fluorescent agent are usually added to use in vacuum impregnation.

Among the previously developed impregnating compositions for sealing porous parts are the compositions disclosed in the patents identified and discussed below.

U.S. Pat. No. 3,672,942 discloses an impregnating composition comprising a free-radical polymerizable acrylate ester monomer and free-radical polymerization initiator e.g., a hydroperoxide.

U.S. Pat. No. 3,969,552 describes an impregnating composition comprising a curable acrylic resin and a peroxide initiator. The wash solution is an aqueous solution of a surfactant of specified formula. The patent further discloses that the aqueous surfactant solution may contain an accelerator to effect polymerization of the anaerobic sealant in the surface areas of the impregnated part being washed.

U.S. Pat. No. Re. 32,240 describes a self-emulsifying anaerobic composition, comprising an anaerobically curing monomer such as an acrylic ester, a peroxy initiator e.g., a hydroperoxide or perester, an anionic or nonionic surfactant which is dissolved in the composition and renders it self-emulsifying upon mixing with water, and optionally an accelerator for the anaerobic polymerization U.S. Pat. No. 4,632,945 discloses an impregnating composition comprising a (meth)acrylate monomer, a hydroperoxide or perester initiator, an accelerator having—$SO_2NCO$—functionality, and a transition metal co-accelerator comprising a source of copper iron and an iron salt or ferrocenyl compound.

U.S. Pat. No. 5,656,710 provides a reactive, i.e., a low viscosity vulcanizable sealant composition having high temperature and chemical resistance and which will not interfere with electrical properties of impregnated electronic parts. This vulcanizable silicon is selected from the group consisting of (i) a heat curable silicone composition formed as the reaction product in the presence of a platinum catalyst of a first silicon and having a molecular weight less than 2000 with a second silicon containing at least two ethylenically unsaturated functionalities and having a molecular weight less than 2000; and (ii) a room temperature vulcanizing silicone composition formed as the reaction product of a silicone fluid containing at least two SiOH functionalities and having a molecular weight less than 2000 with a silane cross-linker of specific formula.

CN 1356365 A provides an impregnating composition with low viscosity and high thermal performance prepared from methyl acrylate monomer, promoter, polymerizing inhibitor and crosslinker consisting of a dienyl compound with a single benzene ring and a methacrylate with three or four functions.

CN 104357010 A provides polyacrylate based impregnating composition by introducing inorganic enforcement particle to ameliorate volume shrinkage issue. However, the curable acrylic resin based impregnating composition has congenital deficiencies, e.g. the impregnation composition residual attached on the part's surface after impregnation process is difficult to remove which affects adhesion and appearance of the part, therefore, a large amount of solvent or cleaning agent is required to wash it repeatedly and hence generating pollution, however, even in this way, the residue still cannot be removed completely. Additional deficiency includes shrinkage problem before and after curing resulting in poor sealing performance. Although it discloses that it can be improved by introducing inorganic enforcement particle into impregnation composition, but this decreases the solid content of curing agent, which achieves a limited sealing property.

Therefore, there is a need to improve the porosity sealing property of the existing impregnating composition used in vacuum impregnation process.

SUMMARY OF THE INVENTION

After intensive studies, the inventors have surprisingly found that the aqueous dispersion can be used as a new category of impregnating composition in vacuum impregnation process.

In one aspect of the present invention, provided is an aqueous dispersion which can be used as impregnating agent, comprising:
- at least one polymer having a carboxyl group and optionally an additional functional group selected from hydroxy, isocyanate, fluoro, phosphate, hydrazide, acetoacetate group and combination thereof,
- in which the polymer has a glass transition temperature of larger than −40° C. and less than 35° C., and
- the aqueous polymer dispersion has a solid content of larger than 50% by weight.

In an additional aspect of the present invention, provided is a solidified product of an aqueous dispersion according to the present invention.

In an additional aspect of the present invention, provided is a part comprising the solidified product according to the present invention.

In an additional aspect of the present invention, provided is an electronic device, comprising the part according to the present invention.

In an additional aspect of the present invention, provided is a method for sealing porosity in a part for sealing porosity in a part.

The aqueous dispersion of the present invention penetrates and fills voids in porous materials, casting metals or part co-molded by metal and plastic in particularly. By using a vacuum process, air is removed from the porosity of parts to be impregnated and replaced with the components in the dispersion. The aqueous dispersion may then be washed and solidified the impregnated part.

In yet another aspect of the invention, provided is the use of the aqueous polymer dispersion according to the present invention in porosity sealing.

The aqueous dispersion of the present invention used as impregnating composition features excellent porosity sealing performance on casting metals or parts co-molded by metal and plastic, and good bonding strength. Additionally, comparing with acrylic resin based impregnating composition, the impregnated part only needs a simple wash by cleaners selected from water, surfactants, alkali solutions or alcohols, and combination thereof, by using the aqueous dispersion of the present invention as impregnating composition, which is an environmental-friendly technique. Besides, the preparation of the dispersion of the present invention and the technique of vacuum impregnation using thereof as well as its post processing are simple for commercial use such as waterproof electronic devices.

DETAILED DESCRIPTION OF THE INVENTION

It is to be understood by one of ordinary skill in the art that the present invention is a description of exemplary embodiments only and is not intended as limiting the broader aspects of the present invention. Each aspect so described may be combined with any other aspect or aspects unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

Unless specified otherwise, the recitation of numerical end points includes all numbers and fractions subsumed within the respective ranges, as well as the recited end points.

The molecular weights refer to number average molecular weights (Mn), unless otherwise stipulated. All molecular weight data refer to values obtained by gel permeation chromatography (GPC), unless otherwise stipulated, e.g. according to DIN 55672.

All references cited in the present specification are hereby incorporated by reference in their entirety.

Unless otherwise defined, all terms used in the present invention, including technical and scientific terms, have the meaning as commonly understood by one of the ordinary skilled in the art to which the present invention belongs.

The present invention is directed to an aqueous polymer dispersion, comprising:
- at least one polymer having a carboxyl group and optionally an additional functional group selected from hydroxy, isocyanate, fluoro, phosphate, hydrazide, acetoacetate group and combination thereof,
- in which the polymer has a glass transition temperature of larger than −40° C. and less than 35° C., and
- the aqueous polymer dispersion has a solid content of larger than 50% by weight.

Polymer

There is no limitation to the polymer used in the aqueous polymer dispersion as long as the other properties of the polymer fulfill the requirements. Typically, the polymer can be selected from poly(meth)acrylic (PA), polyurethane (PUD), vinyl acetate/ethylene copolymer (VAE), acrylic modified VAE, polyvinyl acetate (PVAc), or acrylic modified PVAc, and combination thereof.

Glass Transition Temperature (Tg)

According to the present invention, the aqueous polymer dispersion comprises at least one polymer has a glass transition temperature of larger than −40° C. and less than 35° C. If the Tg is too low, the cohesion of the polymer decreases, therefore the sealant is easy to suffer from deformation and surface shrinkage, and adhesion failure, resulting in poor porosity sealing.

Herein, the glass transition temperature is determined using Differential Scanning calorimetry (TA DSC Q2000) according to the following process. The sample is equilibrated to 40° C., cooled to −50° C. for 2 minutes, then heated from −50° C. to 120° C. at a rate of 10° C. per minute (° C./min), and cooled from 120° C. to room temperature at a rate of 20° C./min. The presence of a step increases in heat flow during the heating from −50° C. to 120° C. indicates that the glass transition has occurred. The glass transition temperature is defined as the temperature at which the heat flow is at the midpoint of the step change.

In preferred embodiments, the aqueous polymer dispersion comprises at least one polymer having a glass transition temperature of −30° C. to 20° C., preferably of from −30° C. to 0° C., and more preferably of from −20° C. to −5° C.

Particle Size

In preferred embodiments, the polymer(s) has a D50 particle size of from 0.2 to 8.0 μm, preferably from 0.2 to 3.0

μm, more preferably from 0.2 to 1.5 μm, and even more preferably from 0.3 to 1.2 μm.

Herein, the "D50 particle size" of the dispersion represents a median diameter in a volume-basis particle size distribution curve obtained by measurement with a laser diffraction particle size analyzer.

Molecular Weight

In preferred embodiments, the polymer(s) has a number average molecular weight of from 8,000 to 300,000 g/mol, preferably from 50,000 to 300,000 g/mol, and more preferably from 100,000 to 300,000 g/mol.

Functional Group

Inventors surprisingly found that the polymers containing carboxyl group and optionally an additional functional group selected from hydroxy, isocyanate, fluoro, phosphate, hydrazide, acetoacetate group generate combined property of excellent porosity sealing and good bonding strength due to various mechanisms. Specifically, (i) carboxyl group can help to slightly erode the surface of metal to generate certain micro porosity to accommodate the particles of the dispersion, therefore, after solidification, the sealant exhibits good bonding strength; (ii) phosphate group increases the bonding to the metal surface because of a chelation-effect generated; (iii) hydroxy group forms Van der Waals force with free hydrogen on the surface of metal; (iv) normally polymers exhibit poor wetting property on metal surface due to their large molecular weight, however hydrazide and acetoacetate groups can exist in aqueous dispersion stably and the keto-hydrazide crosslinking reaction takes place when dispersion is solidifying, therefore, this post-crosslinking of hydrazide and acetoacetate groups greatly helps porosity sealing in parts; (v) isocyanate group effectively improves the cohesion of the dispersion; and (vi) fluoro group shows excellent waterproof and rustproof property.

In some embodiments, the aqueous polymer dispersion comprises at least one polymer having a carboxyl group, in which at least one polymer has a glass transition temperature of larger than −40° C. and less than 35° C. Suitable examples of such polymers include Basf 7104 from BASF, and BLJ-4122 from Shanghai Baolijia Chemical Co., Ltd.

In preferred embodiments, the aqueous polymer dispersion comprises at least one polymer has a carboxyl group and an additional functional group selected from hydroxy, isocyanate, fluoro, phosphate, hydrazide, acetoacetate, and combination thereof, in which at least one polymer has a glass transition temperature of larger than −40° C. and less than 35° C. Suitable examples of such polymers include DE series products under Wanhua Chemical Co., Ltd.

In preferred embodiments, the aqueous polymer dispersion comprises a first polymer having a carboxyl group, and a second polymer having a carboxyl group and an additional functional group selected from hydroxy, isocyanate, fluoro, phosphate, hydrazide, acetoacetate, and combination thereof, in which at least one polymer has a glass transition temperature of larger than −40° C. and less than 35° C. Suitable example of the first polymers include Acronal® V 215 from BASF, BLJ-4122 from Shanghai Baolijia Chemical Co., Ltd. Suitable examples of the second polymers are LUMIFLON® FE-4300 from AGC Chemicals, DE series from Wanhua Chemical Co., Ltd.

In preferred embodiments, the aqueous polymer dispersion comprises a mixture of at least two different polymers having a carboxyl group and an additional functional group selected from hydroxy, isocyanate, fluoro, phosphate, hydrazide, acetoacetate, and combination thereof, in which at least one polymer has a glass transition temperature of larger than −40° C. and less than 35° C. Suitable examples of such polymers include DE-G from Wanhua Chemical Co., Ltd, EM-123 from Guangzhou Lushan New Materials Co., Ltd., VINNAPAS® EAF 68 from Wacker and Tekspro-7610 from Wanhua Chemical Co., Ltd.

Aqueous Polymer Dispersion

According to the present invention, the aqueous polymer dispersion has a solid content of larger than 50% by weight. If the solid content is too low, the formed sealant is not thick enough to withstand air pressure or hydraulic pressure in commercially application.

Herein, the solid content is determined by drying 1-gram dispersion in a common furnace at temperature of 80° C. for 30 minutes and then weighing by a precision scale to calculate the solid content by percentage.

Preferably, the aqueous polymer dispersion has a solid content of no less than 55% by weight, and preferably no less than 60% by weight.

Additives

Preferably, additives may be added to improve stability of the dispersion and meet different mechanical and rheological demands.

For example, neutralizing substance, such as ammonia water and ethanolamine can be added. Such neutralizers are available from Sinopharm Group. If present, the preferred amount is from 0.1 to 1.5% wt based on the total weight of the aqueous dispersion.

Another additive is cellulosic thickeners and polyacrylate thickeners. Preferably, these thickeners are chosen from hydroxymethyl cellulose (HEA), hydroxyethyl cellulose (CMC), BASF VISCALEX AT88, OMG Borch Gel ALA, Contex COAPUR™ 2025 et al. If present, the preferred amount is from 0.1 to 1.5% wt based on the total weight of the aqueous dispersion.

Anti-skinning agent e.g. polyhydroxy alcohols can be added to improve flowability and keep long skin time. Preferred anti-skinning agents can be chosen from Maltitol, Betaine, Sodium lactate available from Sinopharm Group, BYK-348 available from BYK group. Preferably adding amount is of 0.1 to 1.5% by weight based on the total weight of the aqueous dispersion to get good wetting behavior (and long skin time under vacuum).

Adhesion promoters e.g. mutifunctional organosilane or isocyanates crosslinkers can be added to improve the adhesion between inorganic materials such as plastic and organic polymers. Preferably, the adhesion promoter comprises at least one silane group, the silane group contained in the promoter can effectively improves the cohesion of the dispersion Preferred examples are Dynasylan GLYEO and Dynasylan® HYDROSIL 2926 from Evonik, WM44-L70G from Asahi Kasei, and TCI-E0327 available from TCI group. If present, the preferred amount is from 0.1 to 1.5% wt based on the total weight of the aqueous dispersion.

Further example of additive is defoamer. Oil based defoamer, e.g. paraffin oil, mineral oil, silicone based defoamer, or a mixture of polyether and mineral oil may be added. Such defoamer may be selected from BYK-024 from BYK, Foamaster® MO 2134, Foamaster® MO 2150, Foamaster® NO 2335 and FoamStar® ST 2438 from BASF, SN-DEFOAMER 470 and SN-DEFOAMER 485 from SAN NOPCO. If present, the preferred amount is from 0.1 to 1.5% wt based on the total weight of the aqueous dispersion.

It is an object of the present invention to make available aqueous polymer dispersion that are obtainable in a simple, industrially suitable, reproducible manner not restricted to specific polymer type or monomers with the Tg range and solid content range described herein, which exhibits excellent porosity sealing property and good bonding strength.

In another aspect of the present invention, provided is a solidified product of the aqueous polymer dispersion according to this present invention.

In preferred embodiments, the solidified product of the aqueous polymer dispersion has a bonding strength of more than 0.3 MPa, preferably more than 0.35 MPa using testing method of ATSM D1002, in which the testing material is on anodic aluminum (AnAl) and polybutylene terephthalate (PBT) or glass fiber enhanced PBT.

In preferred embodiments, the solidified product of the aqueous polymer dispersion has an average air leakage amount less than 0.1 mL per minute on stainless steel.

In preferred embodiments, the solidified product of the aqueous polymer dispersion has average air leakage amount less than 0.1 mL per minute on aluminum.

In an additional aspect of the present invention, provided is a part comprising the solidified product according to the present invention.

In an additional aspect of the present invention, provided is an electronic device, comprising the part according to the present invention.

For the purpose of the present invention, the "solidified" described herein is intended to mean that the solid content contained in the dispersion to enter into the pores of a part having porosity to become sealant during the drying after impregnation process. This transformation is described as "solidification process" in the present invention, which can be a purely physical transformation or a post-crosslinking chemical reaction if hydrazide and acetoacetate groups are present. Typically, the impregnated part is heated ranging from about 50° C. to about 100° C. during the solidification process, but temperature outside of this range may be used when appropriate.

In an additional aspect of the present invention, provided is a method for sealing porosity in a part for sealing porosity in a part. Basically, the aqueous dispersion of the present invention penetrates and fills voids in porous materials, casting metals or part co-molded by metal and plastic in particularly. By using a vacuum process, air is removed from the porosity of parts to be impregnated and replaced with the agents in the dispersion. The impregnated part then is washed, and the aqueous polymer dispersion is solidified.

To be specific, in the vacuum impregnation process, normally there is an impregnation chamber to place part to be impregnated. The penetration of the aqueous dispersion of the present invention into the porosity of the parts may optionally be assisted by pressurizing the impregnation chamber using compressed air. Typical processes employing the aqueous dispersion of the present invention with reference to impregnating of porous parts contained in a basket which is introduced into the impregnation chamber. This is the typical method if the parts are of suitably small size. In the case of larger parts, the same are typically mounted on or suspended from hoist or carrier. In the wet vacuum impregnation process, the basket of porous parts is submerged into a vacuum tank which is full of aqueous dispersion of the present invention. A short-term, e.g., 10-12-minute, vacuum cycle removes air from the porosity of the parts. The chamber then is returned to ambient pressure, with the dispersion penetrating into the evacuated porosity.

The wet vacuum impregnation process is similarly conducted, but with the impregnation chamber being pressurized at the end of the vacuum cycle to drive impregnating composition further into small porosity passages. In the dry vacuum impregnation method, the basket of porous parts is placed directly in the dry vacuum chamber. Air is evacuated from the porosity in the parts for a selected length of time, e.g., 10 minutes. A transfer valve then is open, allowing aqueous dispersion of the present invention to enter the vacuum chamber from a storage reservoir. The chamber is automatically pressurized to force aqueous dispersion of the present invention into the parts. After impregnation, while the said dispersion is being returned to the reservoir, a free fall then suspends the basket to remove excess surface dispersion. Among the foregoing methods, wet vacuum impregnation techniques are generally more widely employed than the dry vacuum impregnation process, however, either process is suitable for use in the present invention.

Following the initial impregnation step, the impregnated parts are optionally transferred to an agitated water rinse zone, for removal of any remaining dispersion trapped in groove or screw hole of the impregnated parts. The agitation of the water rinse zone may be affected by movement of the basket or suspended parts in such zone and/or mechanical means for effecting circulation of water therein. Water or surfactants or alkali solution and very few alcohols can be used to rinse. In case of a small porous part contained in a basket, it frequently is desirable to operate the water rinse zone in a "tumbling basket" mode to enhance the washing effect. Thereafter, the impregnated parts may be transferred to a solidification zone at temperature from 50° C. to 100° C. to warm the impregnated parts for solidification, a self-crosslinking reaction may be occurred at this juncture when hydrazide, acetoacetate group is present in the aqueous dispersion. In impregnation systems wherein room temperature is used, after the impregnation process, the parts could be transferred to furnace for drying and then cool down at room temperature for overnight. In use, the impregnation composition may be conventionally employed in an impregnation chamber of typical construction, wherein a "wet" or "dry" vacuum is imposed on the porous parts to be impregnated and the evacuated porous parts contact the impregnation composition at higher, e.g. ambient pressure, whereby the impregnant composition pass into the porosity of the porous parts to effect impregnation thereof.

In yet another aspect of the invention, provided is the use of the aqueous polymer dispersion according to the present invention in porosity sealing.

The aqueous dispersion of the present invention used as impregnating composition features excellent porosity sealing performance on casting metals or parts co-molded by metal and plastic, and good bonding strength. Additionally, comparing with acrylic resin based impregnating composition, by using the aqueous dispersion of the present invention as impregnating composition, the impregnated part only needs a simple wash by cleaners selected from water, surfactants, alkali solutions or alcohols, and combination thereof, which is an environmental-friendly technique. Besides, both preparing the dispersion of the present invention and the technique of vacuum impregnation using thereof as well as its post processing is simple for commercial use.

EXAMPLES

The following examples are intended to assist one skilled in the art to better understand and practice the present invention. The scope of the invention is not limited by the examples but is defined in the appended claims. All parts and percentages are based on weight unless otherwise stated.

In the examples, abbreviations are used as follows:
AnAl: anodic aluminum
PBT: polybutylene terephthalate
HDI: hexamethylene diisocyanate
PAEK: phthalazone ether ketone
PA: poly(meth)acrylate
PUD: polyurethane
VAE: vinyl acetate/ethylene Raw Materials Acronal® V 215 is aqueous a PA dispersion of an acrylate copolymer containing carboxyl groups, wherein the acrylate copolymer has a Tg of −43° C., available from BASF.

LUMIFLON® FE-4300 is a PA aqueous dispersion comprising polymer consisting of alternating fluoroethylene and alkyl vinyl ether segments, wherein the PA polymer has Tg of 30° C., available from AGC Chemicals.

VINNAPAS® EAF 68 is an aqueous VAE dispersion, wherein the VAE polymer has Tg of −35° C., available from Wacker.

Basf 7104 is an aqueous PA dispersion of an acrylate copolymer containing carboxyl and having a Tg of −40° C., available from BASF.

EM-123 is an aqueous PA dispersion of an acrylate copolymer containing carboxyl, hydroxymethyl and amide group, and having a Tg of −23° C., available from Guangzhou Lushan New Materials Co., Ltd.

BLJ-4122 is an aqueous PA dispersion of an acrylate copolymer containing carboxyl group and having a Tg of −15° C., available from Shanghai Baolijia Chemical Co., Ltd.

BLJ-3209 is an aqueous PA dispersion of an acrylate copolymer containing carboxyl group and amide group and having a Tg of −35° C., available from Shanghai Baolijia Chemical Co., Ltd.

Tekspro-7610 is an aqueous PA dispersion of an acrylate copolymer containing carboxyl, hydrazide, acetoacetate group, and having a Tg of −13° C., available from Wanhua Chemical Co., Ltd.

DE-B is an aqueous PA dispersion of an acrylate copolymer containing carboxyl, hydrazide, acetoacetate, phosphate group, and having a Tg of −12° C., available from Wanhua Chemical Co., Ltd.

DE-C is an aqueous PA dispersion of an acrylate copolymer containing carboxyl, hydrazide, acetoacetate, phosphate group, and having a Tg of −20° C., available from Wanhua Chemical Co., Ltd.

DE-D is an aqueous PA dispersion of an acrylate copolymer containing carboxyl, hydrazide, acetoacetate, phosphate group, and having a Tg of −5° C., available from Wanhua Chemical Co., Ltd.

DE-F-BLJ is an aqueous PA dispersion of polymer containing carboxyl group, and having a Tg of −30° C., available from Baolijia Chemical Co., Ltd.

DE-G is an aqueous PUD dispersion of an acrylate copolymer containing carboxyl group and having a Tg of −10° C., available by Wanhua Chemical Co., Ltd.

Ammonia water with concentration around from 25% to 28% is available from Sinopharm Group.

Ethanolamine is available from Sinopharm Group.
D-sorbitol is available from Sinopharm Group.
Maltitol is available from Sinopharm Group.
Betaine is available from Sinopharm Group.

Sodium lactate with concentration around 60% is available from Sinopharm Group.

BYK-348 is a silicone surfactant for aqueous dispersion comprising polyether-modified siloxane available from BYK.

H-1400 is available from Guangzhou Hensic New Material Co., Ltd.

wM44-L70G is a blocked polyisocyanate based on HDI available from Asahi Kasei.

Dynasylan® HYDROSIL 2926 is an organosilicon compound based on water, available from Evonik.

TCI-E0327 is 2-(3,4-epoxycyclohexyl) ethyltrimethoxysilane, available from TCI group.

TCI-T3585 is 2-(3,4-epoxicohexyl) ethyltriethoxysilane, available from TCI group.

H-592 is multifunctional poly silicon compound, available from Guangzhou Hensic New Material Co., Ltd.

COAPUR™ 2025 is a solvent and APE free associative polyurethane thickener designed for water-based formulations, available from Contex.

BYK-024 is a mixture of foam-destroying polysiloxanes and hydrophobic solids in polyglycol, available from BYK.

S-8370 is defoamer containing polyether and mineral oil, available from SAN NOPCO.

FoamStar® ST 2437 is defoamer for aqueous dispersion available from BASF.

Foamaster® MO 2134 is defoamer for aqueous dispersion available from BASF.

SN-DEFOAMER 475-L is hydrophobic silica type defoamer available from SAN NOPCO.

Test Methods

Lap Shear Strength

The lap shear strength was determined based on ATSM D1002 in which the testing material was replaced by AnAl and PBT. Specifically, the PBT laminate with dimension of 2 cm in width and 2 mm in thickness was prepared, then they were brushed the dispersion of the examples and then a metal spacer with diameter of 0.127 mm were placed to control the thickness of the sealant. After that, the AnAl were attached to form a sandwich laminate with an effective sealing area of 2010*0.127 mm. Then the sandwich laminate was solidified at a furnace at the temperature of 100° C. for 2 hours, then placed at room temperature for overnight. To determine the tensile strength at break of a sealant layer, the lap shear strength of the samples was measured by INSTRON tensile tester with a test speed of 5 mm/min. The load at failure were recorded accordingly. Larger than 0.3 MPa was considered as acceptable bonding strength.

Leakproof Performance

The testing part was made of aluminum laminate, and the laminate was hollowed out a H-shape in the center molded by PBT. Another testing part was same shape co-molded by stainless steel SUS301 and PAEK. Both two types of part had fine pores between the metal and plastic. The vacuum impregnation was processed using the dispersion of examples described in the present invention. That is, placed the testing parts into the vacuum impregnation tank. The vacuum stage was kept for several minutes and then the vacuum was broken to enable the fine pores of the parts to be impregnated by the dispersion. In the impregnation stage, 5 bar compressed air was introduced through the tank cover to pressurize the vacuum impregnation tank. If the bubble can be seen to escape, the leakage air amount (mL) in 1 minutes was measured to evaluate the leakproof property. After the impregnation stage, the vacuum impregnation tank was opened, and the testing part was taken out.

5 samples were tested for each example using the two testing parts. Each one's air leakage amount was recorded if any, and the average leakage air amount was calculated by arithmetic mean to evaluate the leakage property by the following scale:

| Scale | Average air leakage amount (mL/min) |
|---|---|
| A | 0 |
| B | More than 0 and less than 0.05 |
| C | From 0.05 to less than 0.1 |
| D | From 0.1 to less than 0.2 |
| E | From 0.2 to less than 0.5 |
| F | From 0.5 to less than 0.8 |

C-level or above was considered as acceptable.

Examples 1 to 8 (Ex.1 to Ex.8) and Comparative Examples 1 to 5 (CE.1 to CE. 5)

The dispersions were prepared with the following method using components in amounts (parts by weight) listed in the Table 1, and the properties were tested using the methods stated above, and the results of evaluations are shown in Table 1.

The method of preparing the aqueous dispersion comprises the following steps:

a. mixing the emulsion(s) if there were more than one at room temperature;

b. adding additives by the following orders: neutralizer, anti-skinning agent, promoter, thickener and defoamer, if any, to mix to homogeneity.

TABLE 1

| Components | Ex 1 | Ex 2 | Ex 3 | Ex 4 | Ex 5 | Ex 6 | Ex 7 | Ex 8 |
|---|---|---|---|---|---|---|---|---|
| Acronal ® V 215 | 59.43 | — | — | — | — | — | — | — |
| LUMIFLON ® FE-4300 | — | 79.63 | — | — | — | — | — | — |
| VINNAPAS ® EAF 68 | — | 20 | — | — | — | — | — | — |
| Basf 7104 | — | — | — | — | — | — | — | — |
| EM-123 | — | — | — | — | — | — | — | — |
| BLJ-4122 | — | — | — | — | — | — | — | 79.1 |
| BLJ-3209 | — | — | — | — | — | — | — | — |
| Tekspro-7610 | — | — | — | — | — | — | — | — |
| DE-B | 40 | — | 99.3 | — | — | — | — | — |
| DE-C | — | — | — | 99.38 | — | — | 99.6 | — |
| DE-D | — | — | — | — | 99.38 | 99 | — | — |
| DE-F-BLJ | — | — | — | — | — | — | — | — |
| DE-G | — | — | — | — | — | — | — | 20 |
| Ammonia water | — | — | 0.3 | — | — | 0.5 | — | — |
| Ethanolamine | 0.17 | — | — | 0.42 | 0.42 | — | — | 0.5 |
| D-sorbitol | — | — | — | — | — | — | — | — |
| Maltitol | — | — | — | — | — | — | — | — |
| Betaine | — | — | — | — | — | — | — | — |
| Sodium lactate | — | — | — | — | — | — | — | — |
| BYK-348 | 0.1 | — | 0.1 | — | — | — | — | — |
| H-1400 | — | — | — | — | — | — | — | 0.2 |
| WM44-L7OG | — | 0.17 | — | — | — | — | — | — |
| Dynasylan ® HYDROSIL 2926 | — | — | — | — | — | — | — | — |
| TCI-E0327 | — | — | — | — | — | — | — | — |
| TCI-T3585 | — | — | — | — | — | — | 0.2 | — |
| H-592 | — | — | — | — | — | 0.3 | — | — |
| COAPUR ™ 2025 | 0.1 | — | 0.1 | — | — | — | — | — |
| BYK-024 | 0.2 | 0.2 | 0.2 | — | — | 0.2 | — | — |
| S-8370 | — | — | — | 0.2 | — | — | — | 0.2 |
| FoamStar ® ST 2437 | — | — | — | — | — | — | — | — |
| Foamaster ® MO 2134 | — | — | — | — | 0.2 | — | 0.2 | — |
| SN-DEFOAMER 475-L | — | — | — | — | — | — | — | — |
| Solid Content | 64% | 67% | 61% | 61% | 61% | 60% | 61% | 55% |
| *Functional groups | C, P, HZ, A | C, HO, I, F, Si | C, P, HZ, A | C, P, HZ, A | C, P, HZ, A | C, P, HZ, A | C, P, HZ, Si | C, A, Si |

TABLE 1-continued

| Test Results | | | | | | | | |
|---|---|---|---|---|---|---|---|---|
| AnAl/PBT bonding | 0.35 | 0.40 | 0.41 | 0.3 | 0.78 | 0.38 | 0.48 | 0.4 |
| SUS leakproof | A | A | A | A | A | A | A | C |
| AnAl leakproof | A | A | A | B | B | A | A | C |

*C represents carboxy group; P represents phosphate group; HZ represents hydrazide group; AC represents acetoacetate group; HO represents hydroxy group; I represents isocyanate group; F represents fluoro group; Si represents silane group.

| Components | CE 1 | CE 2 | CE 3 | CE 4 | CE 5 |
|---|---|---|---|---|---|
| Acronal ® V 215 | 99.5 | 99.8 | — | — | — |
| Basf 7104 | — | — | 99.5 | — | — |
| EM-123 | — | — | — | 50 | — |
| BLJ-4122 | — | — | — | — | — |
| BLJ-3209 | — | — | — | 49 | — |
| Tekspro-7610 | — | — | — | — | 99.8 |
| ethanolamine | — | — | — | 0.6 | — |
| BYK-348 | 0.3 | — | — | — | — |
| TCI-E0327 | — | — | 0.3 | — | — |
| H-592 | — | — | — | 0.2 | — |
| BYK-024 | 0.2 | 0.2 | — | — | 0.2 |
| FoamStar ® ST 2437 | — | — | 0.2 | — | — |
| SN-DEFOAMER 475-L | — | — | — | 0.2 | — |
| Solid Content | 68% | 69% | 60% | 58% | 50% |
| *Functional groups | C | C | C, Si | C, HOM, AM | C, P, HZ, AC |
| Test Results | | | | | |
| An Al/PBT bonding | 0.16 | 0.13 | 0.21 | 0.27 | 0.3 |
| SUS leakproof | A | A | C | D | D |
| AnAl leakproof | C | D | F | D | F |

*C represents carboxy group; Si represents silane group; AM represents amide group; HOM represents hydroxymethyl group; AC represents acetoacetate group; P represents phosphate group; HZ represents hydrazide group.

As can be seen from Table 1, the dispersions in the inventive examples, when solidified, exhibited excellent leakproof properties on various materials and maintained high lap shear strength as well compared to the comparative examples.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An aqueous polymer dispersion comprising:
    (1) from about 99.1 to about 99.8 wt % of at least one polymer having (A) a carboxyl group and (B) an additional functional group selected from fluoro, phosphate or hydrazide group;
        wherein the polymer has a glass transition temperature of from about −5 to about −20° C.; and
    (2) 0.1% to 1.5% by weight, based on the total weight of the dispersion of an additive selected from a multifunctional organosilane or isocyanate crosslinker;
        wherein the aqueous polymer dispersion has a solid content of about 60 to about 64% by weight.

2. The aqueous polymer dispersion according to claim 1, wherein the polymer has a particle size (D50) of from 0.2 to 8.0 μm.

3. The aqueous polymer dispersion according to claim 1, wherein the polymer is selected from poly(meth)acrylate (PA), polyurethane (PUD), vinyl acetate/ethylene copolymer (VAE), acrylic modified VAE, polyvinyl acetate (PVAc), or acrylic modified PVAc, and or combination thereof.

4. The aqueous polymer dispersion according to claim 1, wherein the multifunctional organosilane is 2-(3,4-epoxicohexyl) ethyltriethoxysilane, multifunctional polysilicon or foam-destroying polysiloxanes and hydrophobic solids in polyglycol; and
    wherein the isocyanate crosslinker is a hydrophobically ethoxylated urethane polymers.

5. A solidified product of the aqueous polymer dispersion according to claim 1.

6. The solidified product of claim 5, having a bonding strength of greater than 0.3 MPa, in accordance with ATSM D1002 on anodic aluminum and polybutylene terephthalate.

7. The solidified product of claim 5, having an average air leakage amount less than 0.1 mL per minute on a stainless steel substrate.

8. The solidified product of claim 5, having average air leakage amount less than 0.1 mL per minute on an aluminum substrate.

9. The solidified product of claim 5, which is a casting metal or a co-molded metal and plastic part.

10. An electronic device comprising the part casting metal or the co-molded metal and plastic part according to claim 5.

11. A method for sealing porosity in a part, comprising a) vacuum impregnating the aqueous polymer dispersion according to claim 1 into the part and b) solidifying the aqueous polymer dispersion at a temperature range of 50° C. to 100° C.

\* \* \* \* \*